(12) United States Patent
Rivero

(10) Patent No.: US 8,361,593 B2
(45) Date of Patent: Jan. 29, 2013

(54) PLASMONIC COATINGS FOR REFLECTORS

(75) Inventor: Clara A. Rivero, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 1118 days.

(21) Appl. No.: 11/907,756

(22) Filed: Oct. 17, 2007

(65) Prior Publication Data
US 2009/0104406 A1 Apr. 23, 2009

(51) Int. Cl.
*B32B 3/24* (2006.01)
*G02B 1/10* (2006.01)

(52) U.S. Cl. ............ 428/138; 428/137; 428/912.2; 427/162; 427/261; 359/584; 359/286; 359/838

(58) Field of Classification Search .......... 428/137, 428/138, 912.2; 359/584, 586, 838; 427/162, 427/261
See application file for complete search history.

(56) References Cited

U.S. PATENT DOCUMENTS

| | | | |
|---|---|---|---|
| 6,130,780 A | 10/2000 | Joannopoulos et al. | |
| 6,433,931 B1 | 8/2002 | Fink et al. | |
| 6,539,156 B1 | 3/2003 | Dickson et al. | |
| 6,977,767 B2 | 12/2005 | Sarychev et al. | |
| 7,060,510 B2 | 6/2006 | Bonnell et al. | |
| 7,295,723 B2 * | 11/2007 | Hyde | 385/12 |
| 7,301,493 B1 * | 11/2007 | Canales et al. | 342/5 |
| 2009/0195879 A1 * | 8/2009 | Dal Negro et al. | 359/586 |

OTHER PUBLICATIONS

Negative Refractive Index at Optical Wavelengths, C.M. Soukoulis et al, Science, vol. 315, Jan. 5, 2007, pp. 47-49.
Tunable Composite Nanoparticle for Plasmonics, G. Leveque et al., Nanophotonics and Metrology Laboratory, Swiss Fed. Institute of Technology Lausanne, 2006, Optical Society of America, 4 pages.
Plasmonics—Towards Suibwavelength Optical Devices, S. Maier. 2005 Bemtham Science Publishers Ltd., Current Nanoscience, 2005, I, pp. 17-23.
Lecture 13—Nanophotonics in Plasmonics, P.C. Ku, EECS 598-002 Winter 2006, Nanophotonics and Nano-Scale Fabrication, 23 pages.
Electronics and Optoelectronics, Metal Nanoparticle Arrays Guide and Focus Light, Nanoparticle News, Sep. 2002, 5 pages.
M.I.T. Scientists Turn Simple Idea Into "Perfect Mirror", B. Schechter, National Science, Dec. 15, 1998, 4 pages.
Micro-to-Nano-Optics and Plasmonics, 4 pages.
Mirror Fibers Could Create Photonic Fabrics, Y. Fink et al, Massachusetts Institute of Technology, Apr. 23, 2002, 2 pages.
Plasmonics: Nanoscale Manipulation of the Plasmon Response, N. Hales, Rice University, USA, 1 page.
Two-Dimensional Light, or Plasmons, P. Schewe et al., Physics News 770, Mar. 23, 2006, 4 pages.
Plasmonics: Gold Nanoparticles Are Shaped for Effect, J. Hefner, LaserFocusWorld, Edmond Optics Worldwide, Apr. 2006, 6 pages.

* cited by examiner

*Primary Examiner* — William P Watkins, III
(74) *Attorney, Agent, or Firm* — Withrow & Terranova, PLLC

(57) ABSTRACT

A plasmonic coating for reflecting electromagnetic energy is disclosed. The coating includes a plurality of layers, at least one of which is a dielectric layer; and a patterned dielectric layer in structural communication with the plurality of layers and having a pattern configured to plasmonically reflect electromagnetic energy incident thereon.

20 Claims, 4 Drawing Sheets

PLASMONIC COATINGS FOR REFLECTORS

BACKGROUND

1. Field

A plasmonic coating is disclosed which can reflect light within a selected spectral range.

2. Background Information

Known coating technology utilizes multilayer dielectric coatings or metallic coatings to affect the reflectance properties of different optical devices. A dielectric multilayer coating can include multiple layers of different transparent optical materials. Known dielectric multilayer coatings can operate based on an interference effect, and can have a thickness of a few microns depending on the desired wavelength.

Metallic coatings can also be used where, for example, a broadband reflectance property and/or omnidirectional property is desired. Metallic coatings can reflect incoming light at any incidente angle.

A coating can include alternating layers of metallic and dielectric materials. Such a coating has been disclosed by the following article: "M.I.T. Scientists Turn Simple Idea Into 'Perfect Mirror'", by Bruce Schechter, in the National Science of the New York Times Company dated Dec. 15, 1998 (4 pages).

SUMMARY

A plasmonic coating for reflecting electromagnetic energy includes: a plurality of layers, at least one of which is a dielectric layer; and a patterned dielectric layer in structural communication with the plurality of layers and having a pattern configured to plasmonically reflect electromagnetic energy incident thereon.

A method is disclosed for forming a coating for reflecting electromagnetic energy. An exemplary method includes stacking a plurality of layers, the stacked layers including at least one dielectric layer; and forming and patterning a patterned dielectric layer in structural communication with the stacked plurality of layers, the patterned dielectric layer being configured to plasmonically reflect electromagnetic energy incident thereon.

BRIEF DESCRIPTION OF THE DRAWING FIGURES

DETAILED DESCRIPTION

Figure 1:
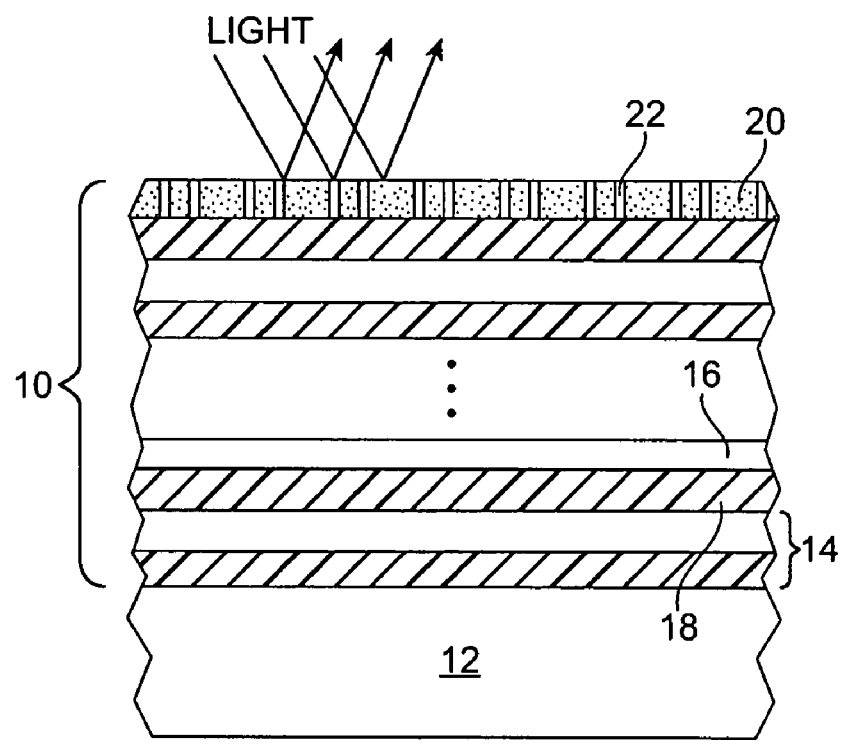
FIG. 1 shows a schematic cross sectional diagram of an exemplary embodiment of a plasmonic coating for reflecting electromagnetic energy.

FIG. 1 shows a schematic cross sectional diagram of an exemplary embodiment of coating 10. The coating 10 can have a reflectance (e.g., high reflectance) in a desired, or design spectral range, wherein the term "design spectral range" refers to a desired wavelength range (i.e., bandwidth) of electromagnetic energy such as visible or non-visible light to be more highly reflected by the coating 10 relative to any other wavelength of incident energy.

As depicted, the coating 10 can be disposed on a substrate 12. The term "substrate" is interpreted broadly to include wafers or other forms of substrates whether rigid or flexible, and includes embodiments in which various additional layers have been disposed.

The coating 10 includes a plurality of layers, at least one of which is formed of dielectric material. The coating 10 can also include a patterned dielectric layer 20 in structural communication with the plurality of layers and having a pattern configured to plasmonically reflect electromagnetic energy incident thereon. As referenced herein, "structural communication" refers to formation and/or placement of a dielectric layer directly on or in sufficient proximity to achieve operational characteristics of a coating as described herein.

The patterned dielectric layer 20 can include a plasmonic pattern that can make a real part of a refractive index of the patterned layer 20 approach zero in the design spectral range, to thereby form an artificial zero-index-material. For purposes of illustration, the patterned dielectric layer 20 is depicted as a first (e.g., top or bottom) layer, although those skilled in the art will appreciate that one or more layers of any suitable composition (i.e., of a composition which will not detrimentally impact desired operation) can be disposed on the patterned layer 20.

The coating 10 can include any of numerous types of layer sequences. In an exemplary embodiment, the coating 10 includes a plurality of layers formed as a repeated sequence of layer units 14, where each layer unit 14 includes, in an exemplary embodiment, two layers 16 and 18 formed of different materials. For example, one of the two layers 16, 18 can be a dielectric layer and the other layer can be a metallic layer or another dielectric layer.

In another exemplary embodiment, each layer unit 14 may include one, two or more different layers, wherein at least one of the layers can be a dielectric layer and the other layers can be formed of either dielectric or metallic material. For example, one or more of plural layer units included within coating 10 can include first, second and third layers, formed of first, second and third dielectric materials, respectively, where each of the dielectric materials are different from one another. Other types of layer sequences will be readily apparent to those skilled in the art and are not described herein. However, it should be apparent to those skilled in the art skill that other suitable types of layer sequences may be practiced without deviating from the spirit of the present teachings.

The dielectric layers of the coating 10 are formed of one or more materials, such as those used for known dielectric mirrors. The materials can be selected depending on the desired spectral range of the coating. The metallic layers of the coating 10 can be formed of metal, such as metal used in known metallic coatings including, but not limited to, Au, Ag, and Al.

The coating 10 can be formed using known techniques, such as vapor deposition or Molecular Beam Epitaxial (MBE) growth technique or other suitable known techniques. The optical thickness of each layer can be selected as a function of the design spectral range of the coating 10. In another exemplary embodiment, the layer unit 14 can include (e.g., consist on two different dielectric layers and an optical thickness of each layer can be about one fourth of the wavelength located at the center of the design spectral range, or any other suitable thickness or thicknesses. In such a case, the stacked plurality of layers in the coating 10 serve as a dielectric mirror, providing a relatively high reflectance in the design spectral range on the order of known dielectric mirrors.

In another exemplary embodiment, the layer unit 14 can include (e.g., consist on a dielectric layer and a metallic layer. In such a case, the coating 10 can provide a relatively high reflectance of a dielectric mirror as well as the omnidirectionality of a metallic coating. The number of layers in the coating 10 can be selected as desired to affect the overall reflectance of the coating.

In yet another exemplary embodiment, the layer unit 14 includes (e.g., consists on two different dielectric layers. A reflectance of, for example, 99.99% can be achieved in an exemplary embodiment by stacking about twenty (or more or less) layer units 14 in a repeated sequence.

The patterned dielectric layer 20 can include, for example, a plurality of unit cells, each of the cells being of any size including, but not limited to, a submicron dimension or smaller. For example, layer 20 can have a submicron or nanostructure pattern that can plasmonically reflect incoming electromagnetic energy incident thereon in the design spectral range. The constituent material of the patterned dielectric layer 20 and the pattern or nanostructure formed in the patterned dielectric layer can affect the plasmon frequency (or, equivalently plasma frequency), which collectively refers to an electronic resonance response of the nanostructure. Systematic variations in the shape of the nanostructure can allow one to control and tune near and far field electromagnetic properties as desired. The plasma frequency can determine an upper boundary of the design spectral range of the coating 10.

Those skilled in the art will appreciate that more than one layer of the coating 10 can be patterned to have nanostructures. For simplicity, the exemplary nanostructure pattern formed in the patterned dielectric layer 20 will be detailed in the following description. However, it should be apparent to those skilled in the art that the other layer(s) in the coating 10 may have similar pattern(s) to that of layer 20, or can be patterned in different desired patterns.

Figure 2A:
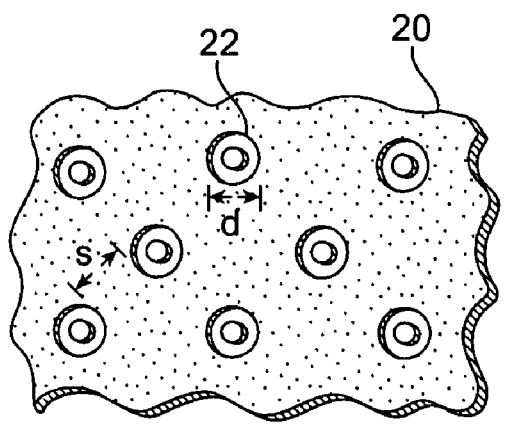
FIG. 2A shows a schematic diagram of an exemplary embodiment of a patterned layer.

FIG. 2A is an exemplary embodiment of a patterned dielectric layer 20 that has an array of ring-shaped holes 22. The outer diameter D of each hole 22, the distance S between two neighboring holes, and the material for the patterned dielectric layer 22 can be varied to obtain an intended plasma frequency $\omega_p$. The plasma frequency $\omega_p$ of a nanostructured layer can be obtained by solving Maxwell's equations with given material properties of the layer, such as dielectric permittivity, and the dimension of the nanostructure as well as the dimension (such as thickness) of the layer. Those skilled in the art can readily solve Maxwell's equations, such that a specific solution need not be described in detail.

Figure 2B:
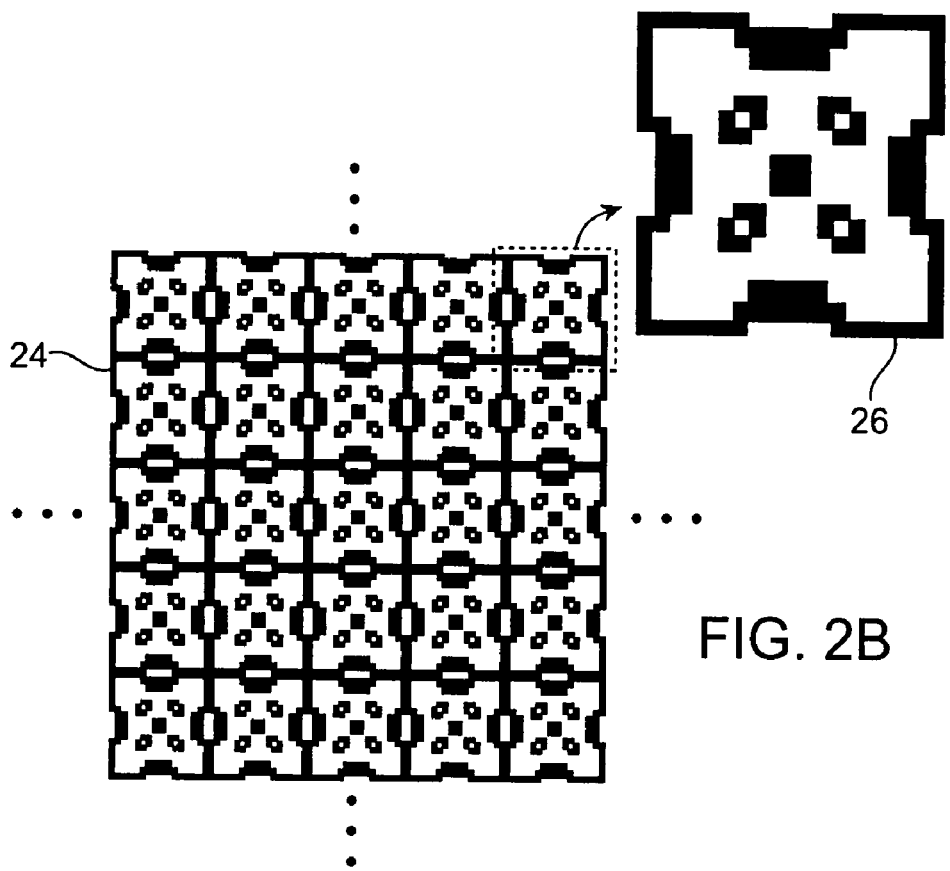
FIG. 2B shows schematic diagram of another exemplary embodiment of a patterned layer.

FIG. 2B shows another exemplary embodiment of a nanostructure pattern 24 which can be implemented in the patterned dielectric layer 20. As depicted, the pattern 24 can include a two-dimensional array of unit cells 26. The dimension of the unit cell 26 can be on the order of a submicron dimension or nanometer dimension, or any suitable dimension. The dark areas in the unit cell 26 represent portions removed from the patterned dielectric layer 20.

Figure 2C:
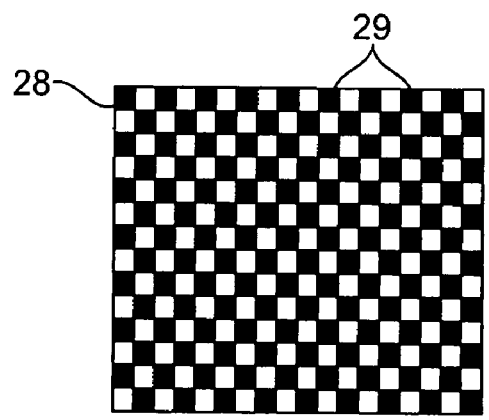
FIG. 2C shows schematic diagram of yet another exemplary embodiment of a patterned layer.

FIG. 2C shows another exemplary embodiment of a nanostructure pattern 28 which can be implemented in the patterned dielectric layer 20. As depicted, the pattern 28 can have a plurality of rectangular holes 29 arranged in a checkerboard form. As in the case of FIG. 2B, the dimension of each hole 29 can be on the order of a submicron or nanometer dimension. The patterns in FIGS. 2A-2C can be formed by any known technique, such as plasma etching with a mask or other suitable techniques.

In an exemplary embodiment, a method of forming a coating, such as coating 10, for reflecting electromagnetic energy is disclosed. An exemplary method includes stacking a plurality of layers, the stacked layers including at least one dielectric layer. The method also includes forming and patterning a patterned dielectric layer in structural communication with the stacked plurality of layers, the patterned dielectric layer being configured to plasmonically reflect electromagnetic energy incident thereon. The coating 10 can be fabricated by forming and patterning layer by layer so that each layer can have a unique pattern and/or no pattern. In another exemplary embodiment, the layers of the entire coating 10 can be formed first and then patterned.

Each of the stacked layers can be formed by vapor deposition technique or Molecular Beam Epitaxial (MBE) growth technique or other suitable technique. Patterning of the dielectric layer can include etching the patterned dielectric layer while in structural communication with the stacked layer.

In an exemplary embodiment, at least one of the stacked layers can be patterned. Such patterning can occur, for example, before or after stacking the plurality of layers.

A stacking of the plurality of layers can include stacking a set of layer units, wherein each layer unit includes a first layer formed of a first dielectric material and a second layer formed of a second dielectric material or metal. Each layer unit can include a third dielectric layer made of a third dielectric material formed on the second layer, wherein the third dielectric material is different from the first and second dielectric materials.

By creating a plasmonic nanostructure pattern in the plasmonic dielectric layer 20, one can add additional functionality to the coating 10. The functionality can include tuning the plasmon frequency to a design spectral range and creating a zero-index material in the design spectral range to, for example, achieve near 100% reflectance in the design spectral range, if desired. Also, as the plasmonic dielectric layer 20 can reflect the light, the minimum number of layers in the coating 10 used to achieve a high reflectance can be considerably lower than that of known dielectric coatings, which can extend the application of the coating 10 to micro-scale devices, such as MEMS mirrors.

The reflectance of a patterned layer as a function of spectral frequency can be related to the linear susceptibility of the layer material. The linear susceptibility of a material, $\chi^{(1)}$, is a complex quantity represented by $\chi=\chi'+i\chi''$, wherein $\chi'$ and $\chi''$ are respectively the real and imaginary susceptibility constants. Using the Lorentz model, the real and imaginary susceptibility constants ($\chi'$ and $\chi''$ respectively) can be represented by:

$$\chi'(\omega) = \omega_p^2 \frac{\omega_o^2 - \omega^2}{(\omega_o^2 - \omega^2)^2 + \Gamma^2\omega^2} \text{ and } \chi''(\omega) = \omega_p^2 \frac{\Gamma\omega}{(\omega_o^2 - \omega^2)^2 + \Gamma^2\omega^2},$$

where $\Gamma$ is the damping (absorption) linewidth at FWHM, $\omega_o$ is the resonance frequency and $\omega_p$ is the plasma frequency. The resonant frequency $\omega_o$ and damping linewidth $\Gamma$ are inherent quantities of the layer material.

Figure 3:
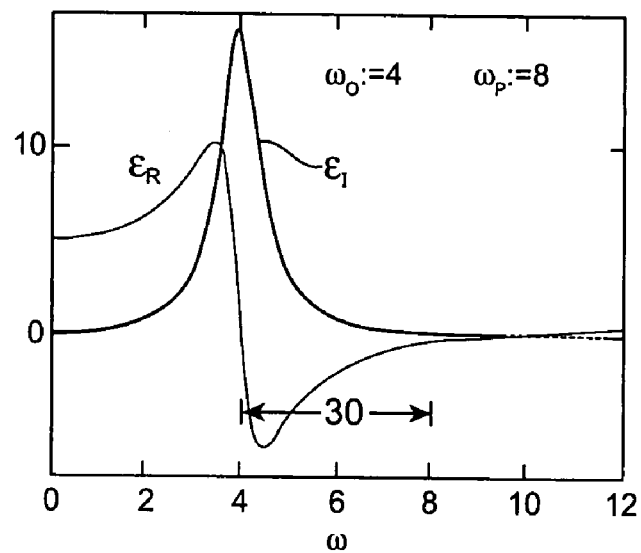
FIG. 3 shows an exemplary plot of real and imaginary parts of a dielectric permittivity.

FIG. 3 is an exemplary plot of real and imaginary parts of a dielectric permittivity as a function of spectral frequency $\omega$, where $\omega$ is related to the wavelength $\lambda$ by an equation $\omega=2\pi/\lambda$. The dielectric permittivity, $\in$, of a material can be related to the linear susceptibility by $\in=1+\omega^{(1)}$. For purposes of illustration, the optical quantities $\omega_o$, $\omega_p$, and $\Gamma$ are respectively set to exemplary values of 4, 8, and 1. In an exemplary embodiment, a real part of a dielectric permittivity of a material forming the patterned dielectric layer is zero or negative within a spectral range bounded by a resonant frequency of the material forming the patterned dielectric layer and by a plasma frequency of the patterned dielectric layer.

The imaginary part, $\in_I$, can correspond to the absorption of light by the material and can have a peak value at the resonant frequancy $\omega_o$. The real part, $\in_R$, can become negative as the frequency exceeds the resonsnat frequency $\omega_o$ and approach zero as the frequency exceeds the plasma frequency $\omega_p$. The spectral range 30 between the resonant frequency $\omega_o$ and plasma frequency $\omega_p$ is referred to as the zero-index-material (ZIM) range. A zero refractive index can imply that all of the oscillators in the material are vibrating in phase such that the phase velocity and wavelength can approach infinity. Thus, light cannot propagate inside the material and is reflected.

Figure 4:
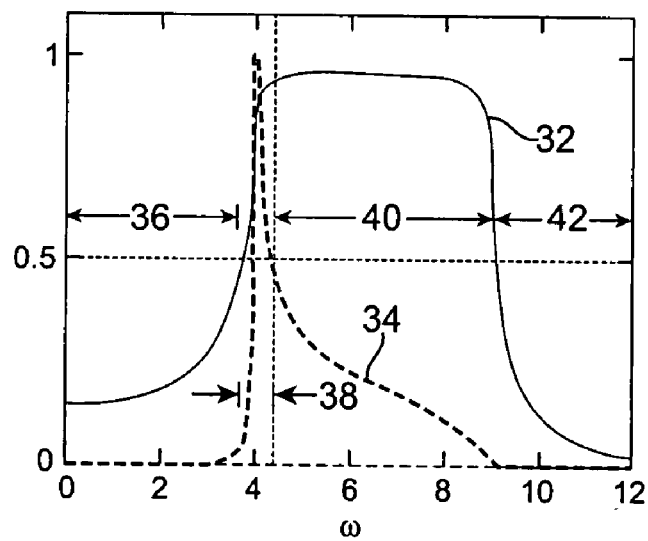
FIG. 4 shows an exemplary plot of absorbance and reflectance band regions at an interface between two different media.

FIG. 4 is an exemplary plot of the absorbance 34 and reflectance 32 of incoming light at an interface between air and the material having the dielectric permittivity function depicted in FIG. 3, with $\Gamma$=0.1. For simplicity, the direction of incoming light is assumed to be normal to the interface. The transmittance (T), reflectance (R) 32, absorbance (A) 34, and refractive index (n), can be governed by the electronic response to the light-matter interaction. The peak value of the absorbance curve 34 can be small compared to the reflectance 32 and as such, the absorbance curve 34 has been normalized to 1 in FIG. 4 for the purpose of illustration. The light incident on the interface can be either reflected, transmitted, or absorbed, depending on the wavelength thereof.

In the first spectral range 36 of FIG. 4, $\omega<\omega_o-\Gamma/2$, the absorbance 34 can be close to zero and the reflectance 32 can range from 0.2 to 0.5. As energy conservation demands R+T+A=1, the transmittance can range from 0.5 to 0.8 in the first spectral range 36. A small portion of the incoming light may be reflected while the rest may pass through the interface. Thus, the range 36 can be primarily considered a transmissive region.

In the second spectral range 38 of FIG. 4, $\omega_o-\Gamma/2<\omega<\omega_o+\Gamma/2$, the absorbance can have its peak value while the reflectance can rapidly increase. In this range, a portion of the incoming light may be absorbed while the rest may be reflected.

In the third spectral range 40, $\omega_o+\Gamma/2<\omega<\omega_p$, most of the light can be reflected. The third range 40 can be within the zero-index material range 30 (FIG. 3) where the real part of the dielectric permittivity, $\in_R$, can be negative or zero. The resonant frequency $\omega_o$ and damping linewidth $\Gamma$ are inherent quantities of the material, while the plasma frequency $\omega_p$ can be determined by the type of material, dimension of the pattern 22 (FIG. 2) and dimension of the patterned dielectric layer 20. Thus, the third spectral range 40 of the patterned dielectric layer 20 can be tailored by selecting a proper material and a pattern formed in the layer so that the design spectral range can be located within the third spectral range 40.

In the fourth spectral range 42 of FIG. 4, $\omega>\omega_p$, the absorbance can approach zero, allowing the incoming light to be reflected or pass through the interface. As the frequency increases, the reflectance 32 can decrease rapidly, allowing most of the incoming light to pass through the interface.

The patterned dielectric layer 20 of the coating 10 can have a nanostructure pattern and can plasmonically reflect the incoming light in a design spectral range. A portion of the incoming light that passes through the patterned dielectric layer 20 can be further reflected by the underlying layers. In an exemplary embodiment, the layer unit 14 can include two different dielectric layers. In another exempalry embodiment, the layer unit 14 can include one dielectric layer and one metallic layer. In both embodiments, the repeated sequence of the FIG. 1 layer unit 14 can serve as a mirror to reflect the light that passes through the patterned dielectric layer 20.

It follows that the overall linear refractive index, defined as $n=\sqrt{\in/\in_o}$ (for non-magnetic materials), can be a complex quantity, $n=\eta+i\kappa$. Here $\eta$ is the factor by which the phase velocity ($\upsilon p$) of the electromagnetic radiation is changed relative to vacuum (c)

$$\left(\text{i.e. } \eta = \frac{c}{\upsilon_P}\right);$$

and $\kappa$ accounts for the linear absorption coefficient ($\alpha$) such that $\alpha=2\omega\kappa/c$. Considering a single air-substrate interface, the reflectance can take the form:

$$R = \frac{(n-1)^2 + \kappa^2}{(n+1)^2 + \kappa^2},$$

at normal incidence.

Figure 5:
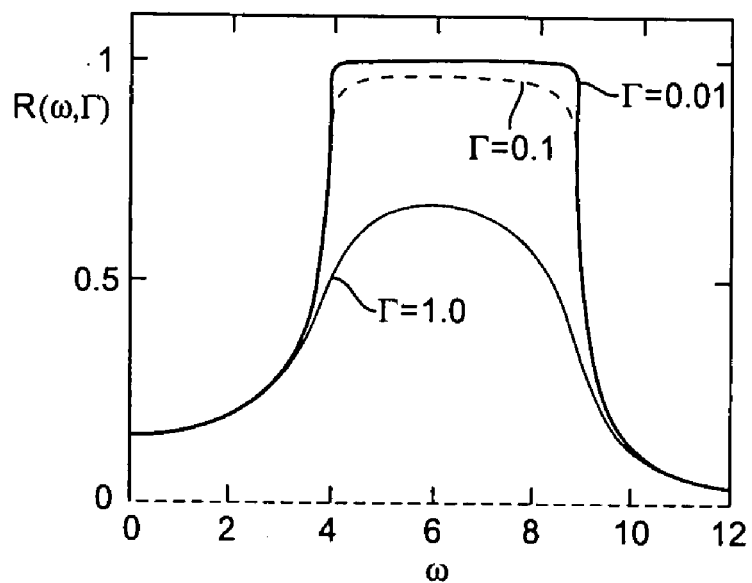
FIG. 5 shows an exemplary plot of reflectance spectra at three different damping linewidths.

FIG. 5 shows an exemplary plot of reflectance R at three different damping linewidths $\Gamma$.

Figure 6:
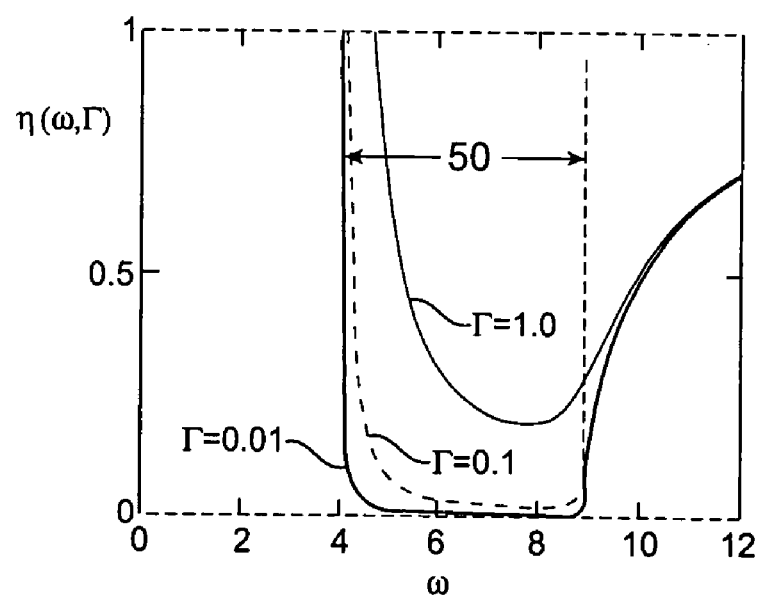
FIG. 6 shows an exemplary plot of a real part of refractive index at three different damping linewidths.

FIG. 6 shows an exemplary plot of $\eta$ at three different damping linewidths $\Gamma$. As depicted, the reflectance R can increase as the damping factor $\Gamma$ decreases, while $\eta$ can decrease as the damping factor $\Gamma$ decreases. The damping factor can affect the lower boundary of the third spectral region 40 (FIG. 4). In general, as the damping factor $\Gamma$ increases, the width of the third spectral region 40 can decrease and the peak value of the reflectrance 32 (FIG. 4) can decrease. Thus, the damping factor $\Gamma$ can be one of the material properties to be considered in tailoring a design spectral range and the reflectance in the design spectral range.

The value of $\eta$ in a spectral range 50 can approach zero as the damping factor $\Gamma$ decreases. In the spectral range 50, which is referred to as zero-index range, the reflectance R can approach 1.0 such that the patterned dielectric layer 20 can reflect most of the light incident thereon and thereby form an artificial zero-index material in the range 50.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

What is claimed is:

1. A plasmonic coating for reflecting light, comprising:
   a plurality of layers, the layers including at least one dielectric layer; and
   a patterned dielectric layer in structural communication with the layers and including a periodically repeated unit cell pattern configured to plasmonically reflect light incident thereon.

2. A plasmonic coating as recited in claim 1, wherein the layers include a set of layers, the set of layers including a first layer formed of a first dielectric material and a second layer formed of a second dielectric material or metal, the first dielectric material being different from the second dielectric material.

3. A plasmonic coating as recited in claim 2, wherein the set of layers includes a third dielectric layer formed of a third dielectric material, the third dielectric material being different from the first and second dielectric materials.

4. A plasmonic coating as recited in claim 2, wherein the layers include a set of layers, the set of layers including a first layer formed of a first dielectric material and a second layer formed of a second dielectric material.

5. A plasmonic coating as recited in claim 1, wherein the pattern includes a plurality of unit cells, each of the unit cells having a dimension of submicron or less.

6. A plasmonic coating as recited in claim 1, wherein at least one of the layers includes a pattern configured to plasmonically reflect light incident thereon.

7. A plasmonic coating as recited in claim 1, wherein the pattern includes a plurality of ring-shaped holes.

8. A plasmonic coating as recited in claim 1, wherein the pattern includes a plurality of unit cells in a two-dimensional array form.

9. A plasmonic coating as recited in claim 1, wherein the real part of the dielectric permittivity of the material forming the patterned dielectric layer is zero or negative within a spectral range bounded by a resonant frequency of the material forming the patterned dielectric layer and a plasma frequency of the patterned dielectric layer.

10. A method of forming a coating for reflecting light, comprising:
    stacking a plurality of layers, the stacked layers including at least one dielectric layer; and
    forming and patterning a dielectric layer in structural communication with the stacked layers and operative to plasmonically reflect light incident thereon, the dielectric layer having a periodically repeated unit cell pattern.

11. A method as recited in claim 10, wherein each of the stacked layers is formed by vapor deposition technique or Molecular Beam Epitaxial (MBE) growth technique.

12. A method as recited in claim 10, wherein the step of patterning a dielectric layer includes etching the dielectric layer in structural communication with the stacked layer.

13. A method as recited in claim 10, wherein at least one of the stacked layers is patterned.

14. A method as recited in claim 10, comprising, after the step of stacking a plurality of layers:
    patterning the stacked layers.

15. A method as recited in claim 10, wherein the step of stacking a plurality of layers includes stacking a set of layers, the set of layers including a first layer formed of a first dielectric material and a second layer formed of a second dielectric material or metal, the third dielectric material being different from the second dielectric material.

16. A method as recited in claim 15, wherein the step of stacking a set of layers includes forming a third dielectric layer made of a third dielectric material on the second layer and wherein the third dielectric material is different from the first and second dielectric materials.

17. A plasmonic coating as recited in claim 2, wherein the metal is selected from the group consisting of Au, Ag and Al.

18. A plasmonic coating as recited in claim 1, wherein the coating has a reflectance of about 99.99%.

19. A plasmonic coating as recited in claim 1, wherein the coating comprises about twenty layer units in a repeated sequence.

20. A plasmonic coating as recited in claim 1, wherein the pattern includes a plurality of rectangular holes.

* * * * *